June 13, 1950 H. G. FERGUSON ET AL 2,511,054
SELF-STARTER FOR VEHICLE ENGINES
Filed Sept. 19, 1947 3 Sheets-Sheet 1

INVENTORS
HENRY GEORGE FERGUSON
JOHN M. CHAMBERS
By Carlson, Pitzner, Hubbard & Wolfe
ATTORNEYS June 13, 1950  H. G. FERGUSON ET AL  2,511,054
SELF-STARTER FOR VEHICLE ENGINES Filed Sept. 19, 1947  3 Sheets-Sheet 2

INVENTORS
HENRY GEORGE FERGUSON
JOHN M. CHAMBERS
By: Carlson, Pitzner, Hubbard & Wolfe
ATTORNEYS June 13, 1950     H. G. FERGUSON ET AL     2,511,054
SELF-STARTER FOR VEHICLE ENGINES
Filed Sept. 19, 1947     3 Sheets-Sheet 3

INVENTORS
HENRY GEORGE FERGUSON
JOHN M. CHAMBERS
By Carlson, Pitzner, Hubbard & Wolf
ATTORNEYS Patented June 13, 1950

2,511,054

UNITED STATES PATENT OFFICE 2,511,054

SELF-STARTER FOR VEHICLE ENGINES

Henry George Ferguson, Gloucestershire, and John M. Chambers, Warwickshire, England Application September 19, 1947, Serial No. 775,130
In Great Britain May 29, 1946

Section 1, Public Law 690, August 8, 1946
Patent expires May 29, 1966

5 Claims. (Cl. 123—179)

The present invention pertains to self-starters for vehicle engines and more particularly to an actuating arrangement for the same especially suited for use on farm tractors.

One general object of the invention is to provide a starter actuating arrangement of such character as to preclude the possibility of energizing the starter motor when the transmission is in gear.

More particularly it is an object to provide an arrangement for utilizing the control or shifter lever of the speed change transmission for closing the starter switch, the setup being such that the lever operates the starter switch only when moved to a particular out of gear position for the transmission.

Further objects and advantages of the invention will become apparent as the following description proceeds taken in connection with the accompanying drawings, in which.

Although a particular embodiment of the invention has been shown and described herein in some detail, there is no intention to thereby limit the invention to the details of structure illustrated. On the contrary, the intention is to cover all modifications and alternative constructions and arrangements falling within the spirit and scope of the invention as expressed in the appended claims.

Figure 1:
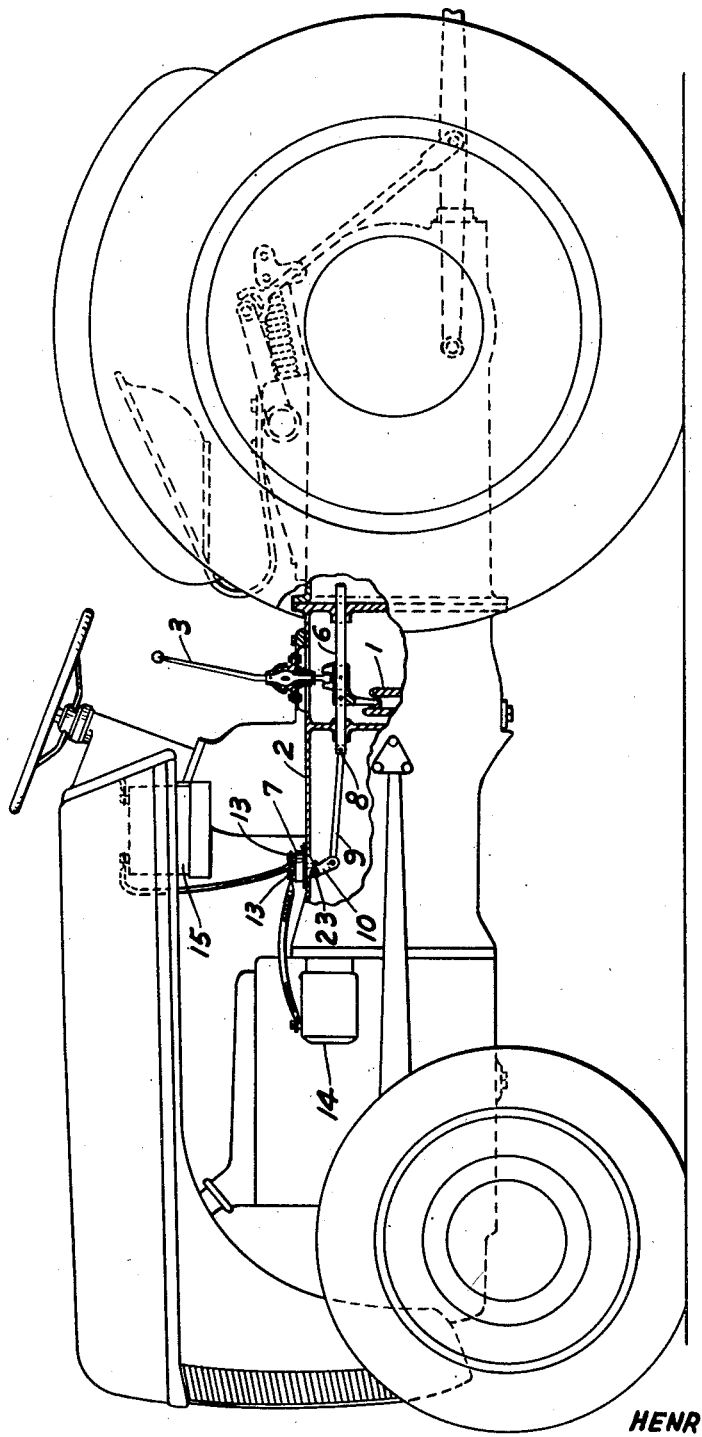
Figure 1 is a slide elevation of an agricultural tractor of known type, being shown largely in diagrammatic fashion and with a portion of the transmission casing broken away to expose the interiorly located portions of the starter switch operating mechanism of the present invention.

Referring more particularly to the drawings, the tractor shown in Fig. 1 is in general of a known type and reference herein need only be made to those parts which are relevant to the present invention. In its central portion the tractor includes a speed change transmission indicated at 1 and contained within a transmission housing or casing 2. The transmission itself may, so far as the present invention is concerned, be of conventional form and is here indicated as being such as to give four speeds forward and one in reverse. It has a shifter lever or control member 3 which is ball mounted in the usual manner and coacts with three shifter rails or shafts 4, 5 and 6. The lever 3 is movable from a centrally located transverse neutral plane into any one of the six positions indicated in Fig. 2 by the forward speed indicia 1, 2, 3 and 4, and the reverse and starting indicia R and S. The rails 4 and 5 are movable backwards or forwards to give a total of four positions for the forward speeds (see Fig. 2). The rail 6 is movable forwardly, on the other hand, to give reverse, the shifter lever 3 moving rearwardly in such case. The forward position of the rail 6 is, however, an out of gear position for the transmission as contrasted with the rearward position of this rail and which is a driving position for the transmission.

The tractor is equipped with a starter switch 7 interposed between the usual electric starter motor 14 and storage battery 15.

In accordance with the present invention, the starter switch 7 is operated by movement of the rail 6 into its out of gear position, that is to say, to its rearward or right-hand position in the particular installation illustrated. For that purpose the end of the rail 6, where it projects through the forward bulkhead 2A of the transmission housing 2 is forked and pivotally connected by a pin 8 to an operating link 9. The forward end of this link is pivoted to one arm of a bell crank 10 located beneath the starter switch 7.

The starter switch 7 is mounted in an aperture 11 in the top wall of the housing 2, being arranged with the operating button 12 for the switch projecting downwardly through the aperture so that it is totally enclosed within the housing. As the rail 6 moves to the right, the consequent rotation of the bell crank in a counterclockwise direction presses the button 12 upward to close the switch 7.

One terminal 13 of the starter switch 7 is connected to the starter motor 14 and the other to the storage battery 15. It will be understood that the illustrated inverted mounting of the switch 7 so positions the actuating member or button 12 that it is not accessible for operation otherwise than as described.

Figure 4:
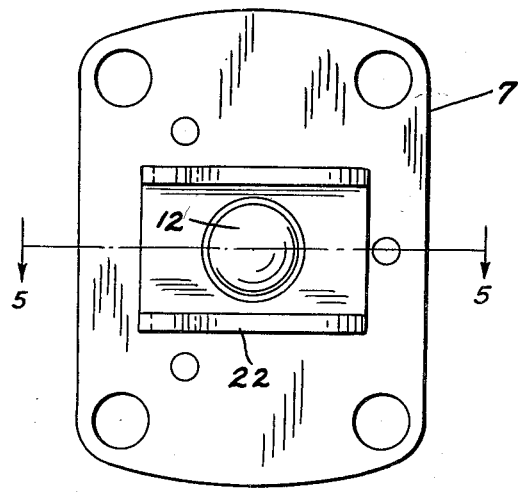
Fig. 4 is an enlarged bottom view of the starter switch included in the apparatus of Figs. 1 to 3.
Figure 5:
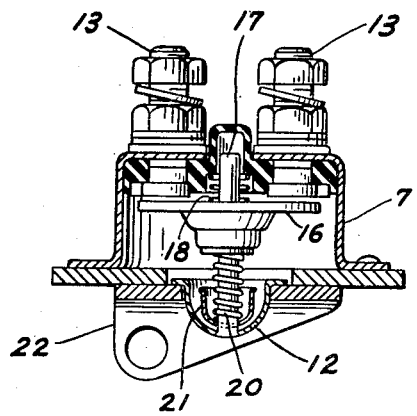
Fig. 5 is a vertical sectional view through the starter switch taken substantially along the line 5—5 in Fig. 4.

The starter switch itself may, of course, take a variety of forms, a suitable construction being illustrated in Figs. 4 and 5. As there indicated, it is a normally open switch comprising a pair of terminal assemblies 13 mounted in insulated relationship and adapted to be connected by a bridge 16. This bridge is slidably received on a spindle 17 fixed at its lower end to the dome shaped button 12. A compression spring 18, interposed between the upper face of the bridge 16 and a shoulder on the insulating cover insert for the switch normally holds the bridge piece 16 in the open position shown in Fig. 5.

A second compression spring 20, more powerful than the first mentioned spring 18, encircles the lower portion of the spindle or pin 17. It is interposed between the lower side of the bridge 16 and a cup 21 within the button 12.

When the button 12 is pressed upward the spring 20 is strong enough to force the bridge 16 upward against the pressure of the opposed spring 18 and thus seat the bridge firmly against the terminals 13. Continued upward movement of the button 12 serves, however, to compress the spring 20, thereby precluding breakage of the spindle 17 even when movement of the button is excessive.

A bracket 22 of inverted U-shape is fixed in place beneath the switch 7, being apertured to receive a pivot pin 23 for the bell crank 10.

Figure 2:
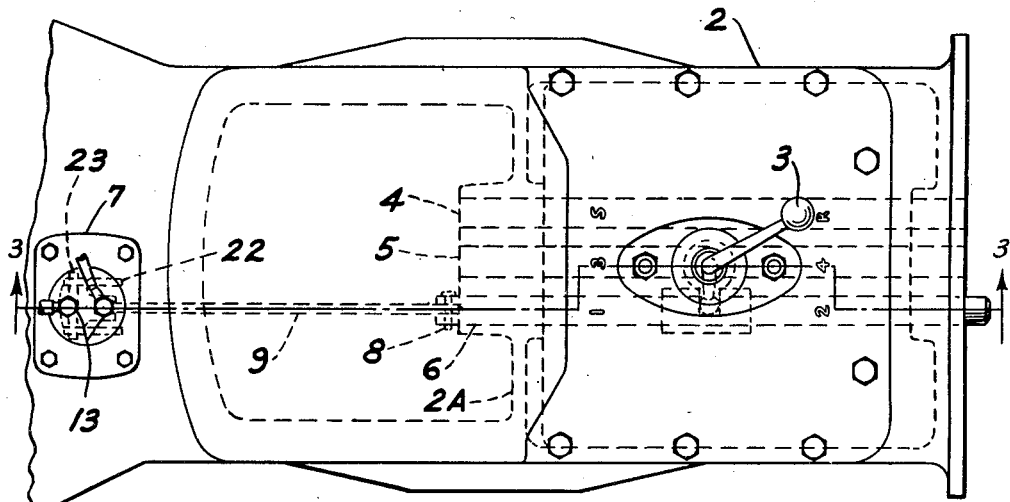
Fig. 2 is a plan view, on somewhat enlarged scale, of the transmission housing for the tractor shown in Fig. 1.
Figure 3:
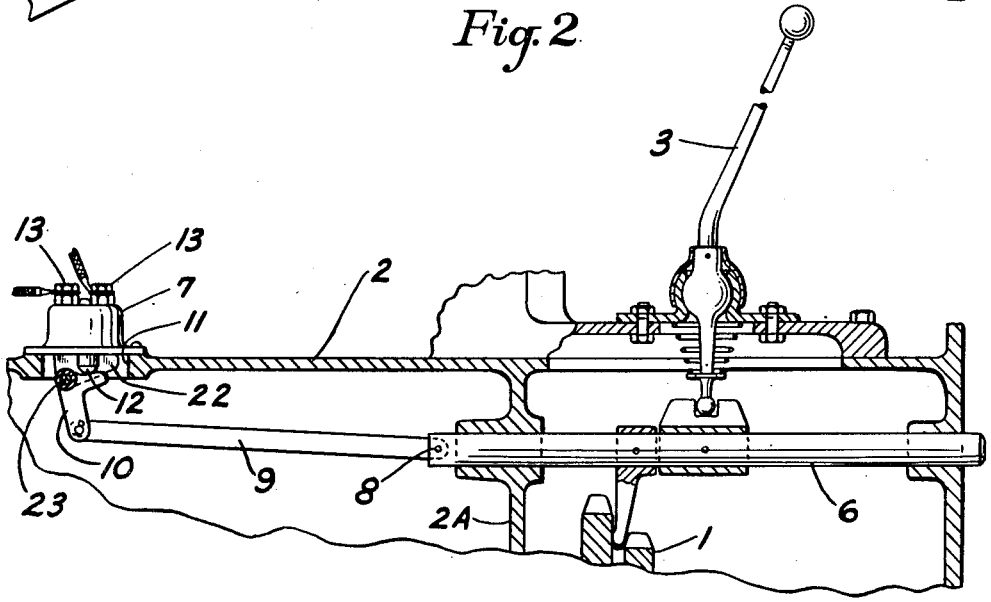
Fig. 3 is a longitudinal sectional view taken substantially along the line 3—3 in Fig. 2.

To close the starter switch 7 the operator moves the shifter lever 3 forward and to the right into the position marked "S" in Fig. 2. This is an out of gear position for the transmission. The ensuing rearward movement of the shifter rail 6 rocks the bell crank 10 counterclockwise, urging the button 12 upward to thereby close the starter switch 7 and thus energize the starter motor 14 from the battery 15. Having thus started the tractor engine, the shifter lever 3 is manipulated in the usual manner for changes in speed and direction for the tractor. Since the starter position for the shifter lever 3 is a terminal one of the series of positions available, the danger of inadvertently closing the starter switch when shifting gears during normal operation is minimized. On the other hand, there is, in effect, an interlock between the transmission and starter so that the starter switch can only be closed when the speed change transmission is in an out of gear condition. Damage to the starter motor due to inadvertently energizing the same when the tractor is in gear is thus precluded.

We claim:

1. The combination with a vehicle speed-change transmission having a control lever shiftable from a transverse neutral plane into selected ones of a plurality of optionally available positions each corresponding to different speed and direction setups for the transmission except one which is an out of gear position for the transmission, of a starter switch, and a connection from said lever to said switch for actuating the latter in response to positioning of said lever in said out of gear position therefor.

2. The combination of a vehicle speed-change transmission, a control lever for such transmission shiftable from a transverse neutral plane to any one of a series of positions and in which one terminal position of the series is an out of gear position for the transmission, a starter switch having an actuator, and connections from said actuator to said lever for shifting said actuator into switch operating position by movement of said lever into said out of gear position therefor.

3. The combination of a vehicle speed-change transmission including a plurality of shifter rails disposed in parallelism for individual axial sliding movement, a shifter lever engageable with selected ones of said rails for shifting them endwise from central positions therefor to alternate limit positions of endwise movement, one such limit position of one of said rails being an out of gear position for the transmission, the other limit position of said one of said rails being a driving position for the transmission, a starter motor and a source of current with a normally open starter switch interposed therebetween, and a linkage connecting said one rail with said switch for closing the latter in response to shift of said one rail into said one position.

4. The combination of a vehicle speed-change transmission including a plurality of shifter rails disposed in parallelism for individual axial sliding movement, a shifter lever engageable with selected ones of said rails for shifting them endwise from central positions therefor to alternate limit positions of endwise movement, one such limit position of one of said rails being an out of gear position for the transmission, the other limit position of said one of said rails being a driving position for the transmission, a normally open push button type starter switch, a bell crank pivoted with one arm thereof swingable into and out of engagement with the button of said switch, and a connecting link pivotally connected between the other arm of said bell crank and an end of said one rail for swinging said bell crank into switch closing position upon movement of said one rail into said one limit position therefor.

5. The combination of a vehicle speed-change transmission having a housing with an aperture therein, a starter switch mounted on said housing with an actuator therefor projecting through said aperture and totally enclosed within said housing, a control lever for said transmission located exteriorly thereof and projecting with the same, said lever being shiftable from a transverse neutral plane to any one of a plurality of optionally available positions, each corresponding to different speed and direction setups for the transmission except one which is an out of gear position for the transmission, and a connection within said housing from said lever to said switch actuator for operating the latter in response to positioning of said lever in said out of gear position therefor.

HENRY GEORGE FERGUSON.
JOHN M. CHAMBERS.

REFERENCES CITED

The following references are of record in the file of this patent:

UNITED STATES PATENTS

| Number | Name | Date |
|---|---|---|
| 1,908,907 | Lessler | May 16, 1933 |
| 2,374,303 | Osborne | Apr. 22, 1945 |